(12) United States Patent
Hoek et al.

(10) Patent No.: US 7,488,083 B2
(45) Date of Patent: Feb. 10, 2009

(54) VEHICULAR REARVIEW COMPONENTS AND ASSEMBLIES

(75) Inventors: Steven G. Hoek, Holland, MI (US);
Kenton J. Ypma, Hudsonville, MI (US);
Jeremy A. Fogg, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 252 days.

(21) Appl. No.: 11/209,154

(22) Filed: Aug. 22, 2005

(65) Prior Publication Data

US 2007/0041110 A1 Feb. 22, 2007

(51) Int. Cl.
*G02B 7/182* (2006.01)
*B60R 1/04* (2006.01)

(52) U.S. Cl. .............. 359/871; 359/872; 248/475.1

(58) Field of Classification Search ............. 359/604, 359/871, 872; 248/479, 481, 475.1
See application file for complete search history.

(56) References Cited

U.S. PATENT DOCUMENTS

| | | | |
|---|---|---|---|
| 2,588,825 A * | 3/1952 | Goodman et al. ......... 219/219 |
| 3,338,545 A * | 8/1967 | Magi ..................... 248/481 |
| 3,507,562 A * | 4/1970 | Yamashita et al. ........ 359/606 |
| 3,982,119 A | 9/1976 | Aluzzo et al. |
| 4,214,266 A | 7/1980 | Myers |
| 4,256,372 A | 3/1981 | Yasukuni et al. |
| 4,277,804 A | 7/1981 | Robison |
| 4,554,587 A | 11/1985 | Ooi et al. |
| 4,580,196 A | 4/1986 | Task |
| 4,631,516 A | 12/1986 | Clinker |
| 4,647,975 A | 3/1987 | Alston et al. |
| 4,667,177 A | 5/1987 | Athalye |
| 4,734,697 A | 3/1988 | Robinson et al. |
| 4,863,130 A | 9/1989 | Marks, Jr. |
| 4,868,542 A | 9/1989 | Thompson |
| 4,891,624 A | 1/1990 | Ishikawa et al. |
| 4,893,112 A | 1/1990 | Hatcher |
| 4,896,136 A | 1/1990 | Hotovy |
| 4,910,591 A | 3/1990 | Petrossian et al. |
| 4,928,084 A | 5/1990 | Reiser |
| 5,027,200 A | 6/1991 | Petrossian et al. |
| 5,038,258 A | 8/1991 | Koch et al. |
| 5,121,200 A | 6/1992 | Choi |
| 5,126,926 A | 6/1992 | Chiang Wen |
| 5,136,483 A | 8/1992 | Schoniger et al. |
| 5,143,433 A | 9/1992 | Farrell |
| 5,194,957 A | 3/1993 | Kyuma |
| 5,241,457 A | 8/1993 | Sasjima et al. |

(Continued)

FOREIGN PATENT DOCUMENTS

DE 29806638 4/1998

(Continued)

OTHER PUBLICATIONS

Patent Abstracts of Japan, Pub. No. 06092184, Publ. Dated Apr. 5, 1994, Application No. 04242151 entitled "Vehicle Rearward Checking Device," Applicant Chinon Ind Inc.

(Continued)

*Primary Examiner*—Ricky D Shafer
(74) *Attorney, Agent, or Firm*—James E. Shultz, Jr.

(57) ABSTRACT

The present invention provides improved vehicular rearview assemblies and components for incorporation into rearview assemblies.

11 Claims, 8 Drawing Sheets

U.S. PATENT DOCUMENTS

| | | | |
|---|---|---|---|
| 5,260,731 | A | 11/1993 | Baker, Jr. |
| 5,289,321 | A | 2/1994 | Secor |
| 5,307,136 | A | 4/1994 | Saneyoshi |
| 5,325,271 | A | 6/1994 | Hutchisson |
| 5,371,659 | A | 12/1994 | Pastrick et al. |
| 5,387,958 | A | 2/1995 | Pashley |
| 5,414,461 | A | 5/1995 | Kishi et al. |
| 5,471,515 | A | 11/1995 | Fossum et al. |
| 5,477,436 | A | 12/1995 | Bertling et al. |
| 5,490,049 | A | 2/1996 | Montalan et al. |
| 5,495,243 | A | 2/1996 | McKenna |
| 5,550,677 | A | 8/1996 | Schofield et al. |
| 5,555,069 | A | 9/1996 | Albrecht et al. |
| 5,631,704 | A | 5/1997 | Dickinson et al. |
| 5,646,614 | A | 7/1997 | Abersfelder et al. |
| 5,670,935 | A | 9/1997 | Schofield et al. |
| 5,680,123 | A | 10/1997 | Lee |
| 5,699,044 | A | 12/1997 | Van Lente et al. |
| 5,765,940 | A | 6/1998 | Levy et al. |
| 5,798,691 | A | 8/1998 | Kao |
| 5,895,115 | A | 4/1999 | Parker et al. |
| 5,904,330 | A | 5/1999 | Manico et al. |
| 5,938,717 | A | 8/1999 | Dunne et al. |
| 6,038,496 | A | 3/2000 | Dobler et al. |
| 6,115,651 | A | 9/2000 | Cruz |
| 6,151,065 | A | 11/2000 | Steed et al. |
| 6,175,300 | B1 | 1/2001 | Kendrick |
| 6,246,933 | B1 | 6/2001 | Bague |
| 6,259,475 | B1 | 7/2001 | Ramachandran et al. |
| 6,262,764 | B1 | 7/2001 | Perterson |
| 6,304,173 | B2 | 10/2001 | Pala et al. |
| 6,320,612 | B1 | 11/2001 | Young |
| 6,329,925 | B1 * | 12/2001 | Skiver et al. ............ 340/815.4 |
| 6,805,474 | B2 * | 10/2004 | Walser et al. ............... 362/494 |
| 6,824,281 | B2 * | 11/2004 | Schofield et al. ........... 359/876 |
| 7,008,069 | B2 * | 3/2006 | Ostreko et al. ............. 359/876 |
| 7,196,836 | B2 * | 3/2007 | Bauer et al. ................ 359/265 |
| 7,266,204 | B2 * | 9/2007 | Watson et al. ................ 381/86 |
| 7,287,868 | B2 * | 10/2007 | Carter et al. ............... 359/871 |
| 2003/0043590 | A1 * | 3/2003 | Walser et al. ............... 362/494 |
| 2005/0128610 | A1 * | 6/2005 | Parker et al. ................ 359/871 |
| 2005/0231969 | A1 * | 10/2005 | Fogg et al. .................. 362/494 |

FOREIGN PATENT DOCUMENTS

| | | |
|---|---|---|
| EP | 0244230 | 11/1987 |
| EP | 0417397 | 3/1991 |
| EP | 0573235 | 12/1993 |
| GB | 2233530 | 9/1991 |
| GB | 2313973 | 12/1997 |
| JP | 9207664 | 8/1997 |
| WO | WO 9638319 | 12/1996 |
| WO | WO 9717800 | 5/1997 |

OTHER PUBLICATIONS

Patent Abstracts of Japan, Pub. No. 09030326, Pub. Date Feb. 4, 1997, Application No. 07207630, entitled "Visual Recognition Device for Vehicle," Applicant Murakami Corp.

Patent Abstracts of Japan, Pub. No. 09320000, Pub. Date Dec. 12, 1997, App. No. 08135617, entitled "Backward Information Detecting Device," Applicant Nippon Seiki Co. Ltd.

Photographs of a CHMSL of a 1996 Chrysler Town & Country.

Photographs of a CHMSL of a 1995 Ford F150 Pickup Truck.

Photographs of a CHMSL of a 1996 Chevy Blazer.

Mendis, Sunetra K, "Low-Light-Level Image Sensor with On-Chip Signal Processing," SPIE, vol. 1952 pp. 23-33.

Fossum, Eric R., Active Pixel Sensors: Are CCD's Dinosaurs?, SPIE, vol. 1990 pp. 2-14.

Fossum, Eric R., "Low Power Camera-on-a-Chip Using CMOS Active Pixel Sensor Technology," 1995 Symposium on Low Power Electronics, Oct. 9-10, 1995 San Jose, CA, pp. 1-4.

Yadid-Pecht, Orly et al., "Readout Schemes to Increase Dynamic Ranges of Image Sensors," NASA Tech Briefs, Jan. 1997, (2 pages).

Yadid-Pecht, Orly et al., "Image Sensors With Individual Pixel Reset," NASA Tech Briefs, Nov. 1996, (2 pages).

Patent Abstracts of Japan, Pub. No. 09-207664, Pub. Date Aug. 12, 1997, Application No. 08-017826, entitled "Vehicular Rear Confirmation Device," Applicant Fujitsu Ten Ltd.

* cited by examiner

US 7,488,083 B2

VEHICULAR REARVIEW COMPONENTS AND ASSEMBLIES

BACKGROUND OF THE INVENTION

Vehicular rearview assemblies have long been incorporated into vehicles for providing generally rearward views of a vehicle to a driver. Improvements are needed to various components and rearview assemblies incorporating the components.

SUMMARY OF THE INVENTION

The present invention provides improved vehicular rearview assemblies and components for incorporation into rearview assemblies.

DETAIL DESCRIPTION OF THE INVENTION

Vehicular rearview assemblies have recently incorporated various electronic accessories and components. As the number of electronic features within a rearview assembly increases, the number of associated wires interconnecting to the associated vehicle typically increases. Vehicle manufacturers and consumers prefer that the related wiring is at least partially hidden from view once the rearview assembly is installed in a related vehicle. Rearview assembly installers desire to simplify installation by providing quick connections for interconnecting wiring.

Figure 1:
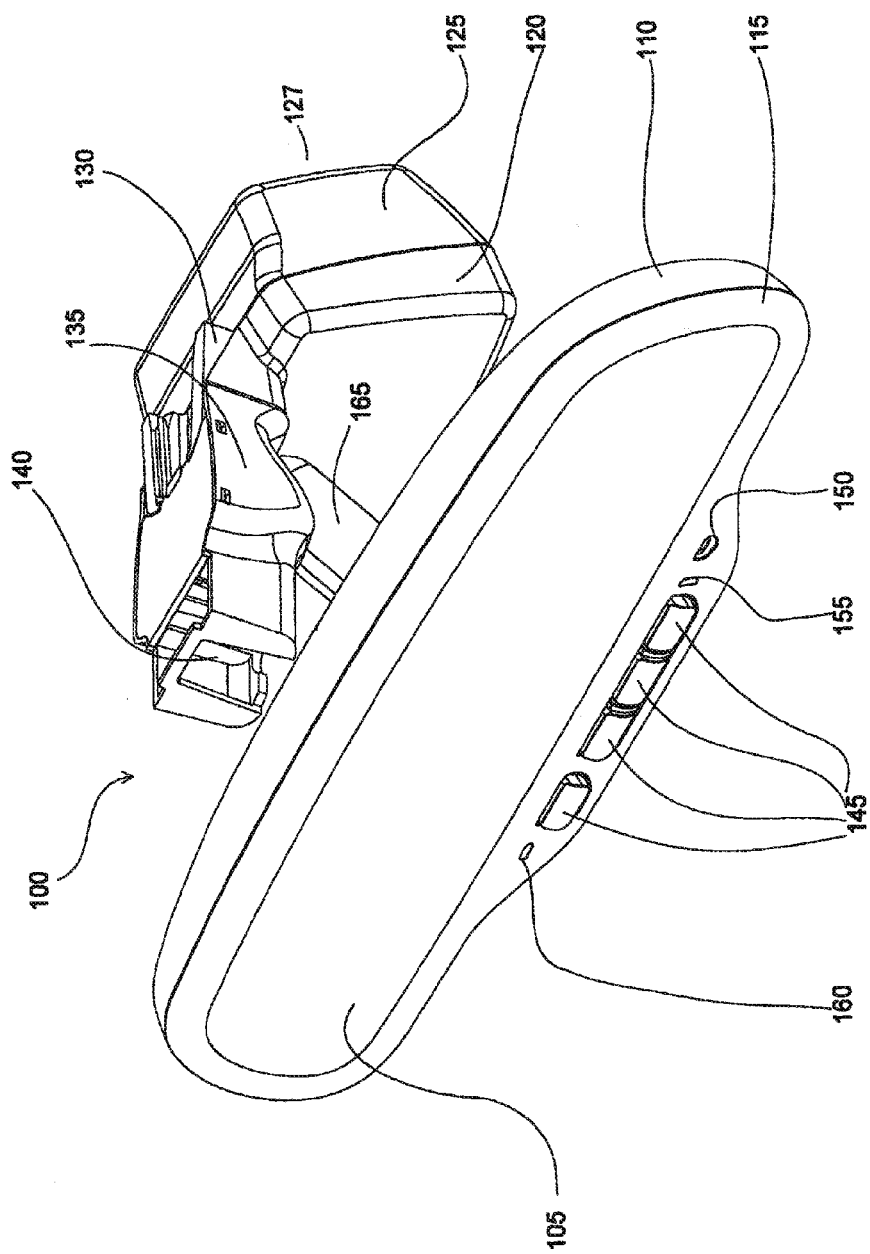
FIG. 1 depicts a front perspective view of a rearview assembly.

Turning to FIG. 1, a front perspective view of a rearview assembly 100 is depicted including a housing 110, an accessory module 127, a mount 130 and a stem 165. In at least one embodiment, a rearview element 105 is positioned within the housing and at least partially retained via a bezel 115. It should be understood that the rearview element may be a prismatic mirror element, an electro-optic mirror element or a display element, any one of which are configured to provide a generally rearward view of the controlled vehicle to a driver. In at least one embodiment, the rearview assembly may comprise at least one operator interface 145, a rearview element status indicator 155, a glare light sensor 150, at least one general purpose indicator 160, a sub-combination thereof or a combination thereof. It should be understood that any one of these devices may be located elsewhere within the rearview assembly aside from the chin portion of the bezel, including, but not limited to, an upper portion, a side portion, a bottom portion, a top portion, a rear portion or incorporated into an accessory module 127. In at least one embodiment, the accessory module 127 comprises a front cover 120 and a rear portion 125 configured to snap interlock together. In at least one embodiment, a rearview assembly includes a wire cover 135 and/or a wire connector 140. It should be understood that associated wiring (not shown in FIG. 1) may be routed through the mount and/or stem such that it is substantially out of sight; an example of such a configuration is described in commonly assigned U.S. Pat. No. 6,068,380, the contents of which are incorporated herein in its entirety by reference.

Figure 2:
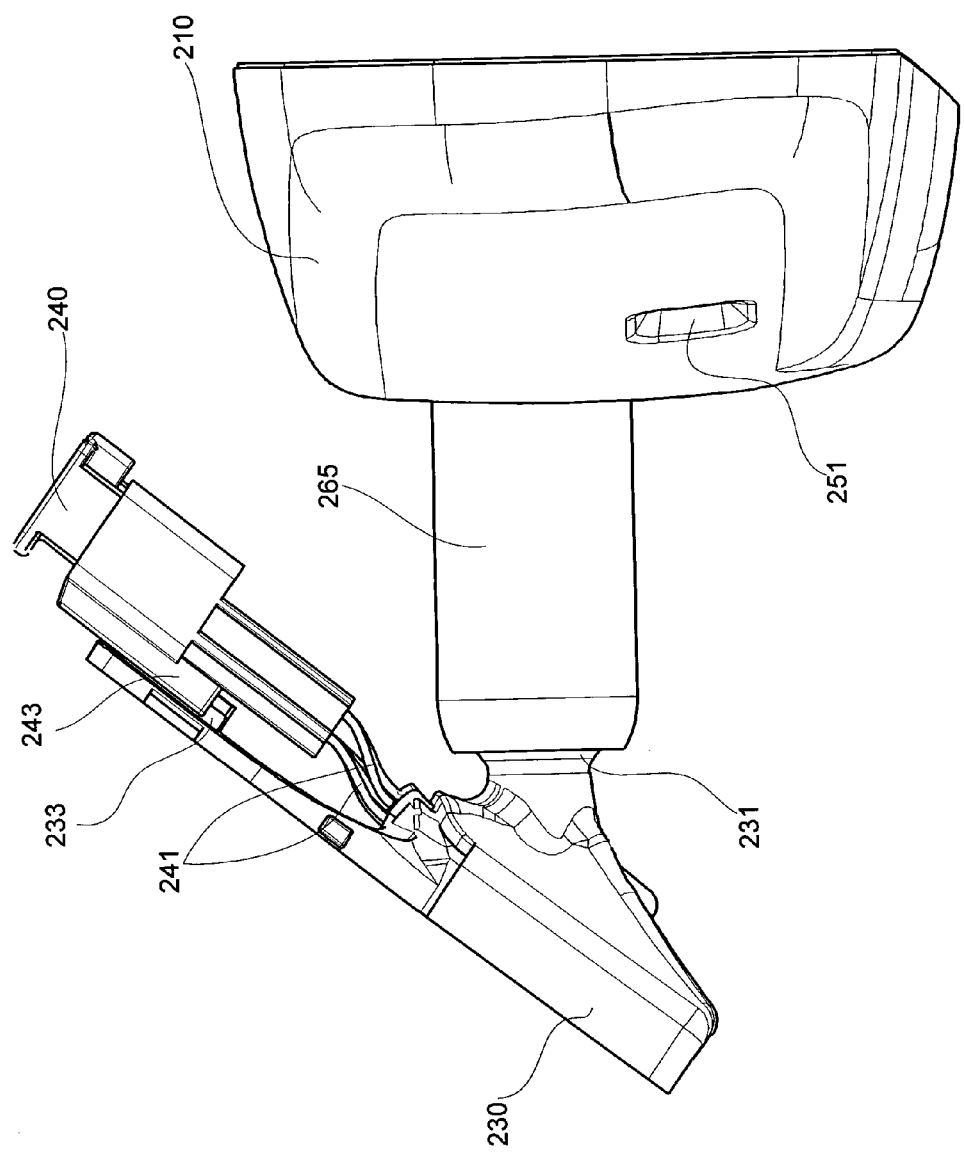
FIG. 2 depicts a side profile view of a rearview assembly.

FIG. 2 depicts a side profile view of a rearview assembly comprising a housing 210, a mount 230 and a stem 265. In at least one embodiment, the rearview assembly is configured such that the housing is pivotally attached to the mount via a stem and a first rotation ball 231. In at least one embodiment, interconnecting wiring 241 is routed through the stem and/or mount to a connector 240. In at least one embodiment, a connector comprises a first interlock 243 and a mount comprises a second interlock 233 configured such that the connector is secured to the mount to facilitate plugging a vehicle wire harness (not shown) into the connector without the connector being otherwise held in place. It should be understood that the interlocks may be configured such that the two portions slidingly engage, snap together, are friction fit together, a sub-combination thereof or a combination thereof and may be able to pivot slightly with respect to one another to assist plugging in the wire harness. In at least one embodiment, a rearview assembly comprises an ambient light sensor 251. In at least one embodiment, an ambient light sensor and/or a glare light sensor are provided and configured to automatically control either the reflectivity or intensity of an associated rearview element.

Figure 3:
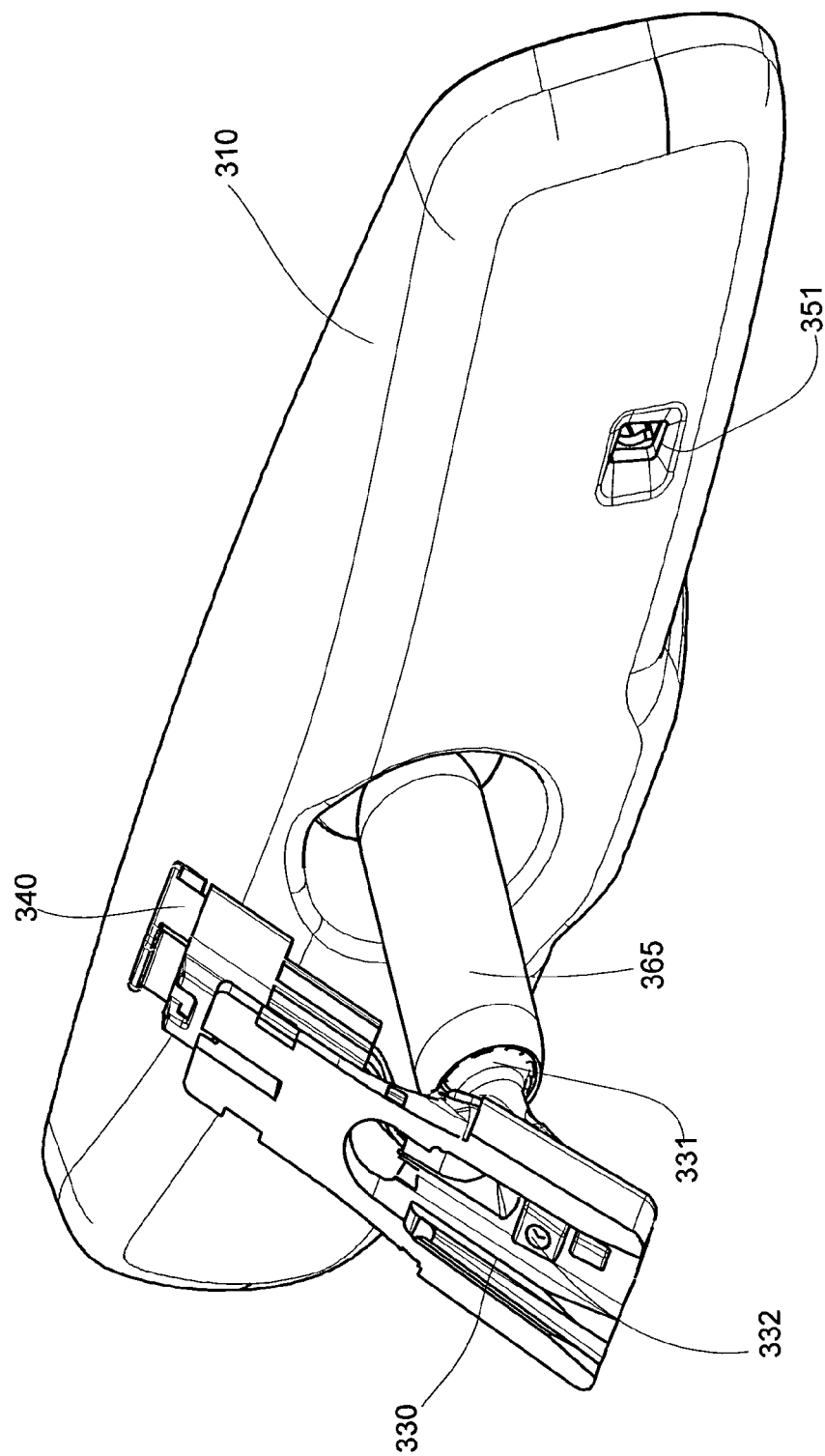
FIG. 3 depicts a rear perspective view of a rearview assembly.

Tuning now to FIG. 3, a rear perspective view of a rearview assembly is depicted comprising a housing 310, a mount 330 and a stem 365. In at least one embodiment, an ambient light sensor aperture 351 is provided in the housing. In at least one embodiment, a mount comprises a first rotation ball 331 and a fastener 332 for securing the mount to a windshield button (not shown). It should be understood that a mount may be configured such that the rearview assembly is secured to an overhead portion of the related vehicle in lieu of being attached to the windshield. In at least one embodiment, a connector 340 is provided for interconnecting wiring.

Figure 4:
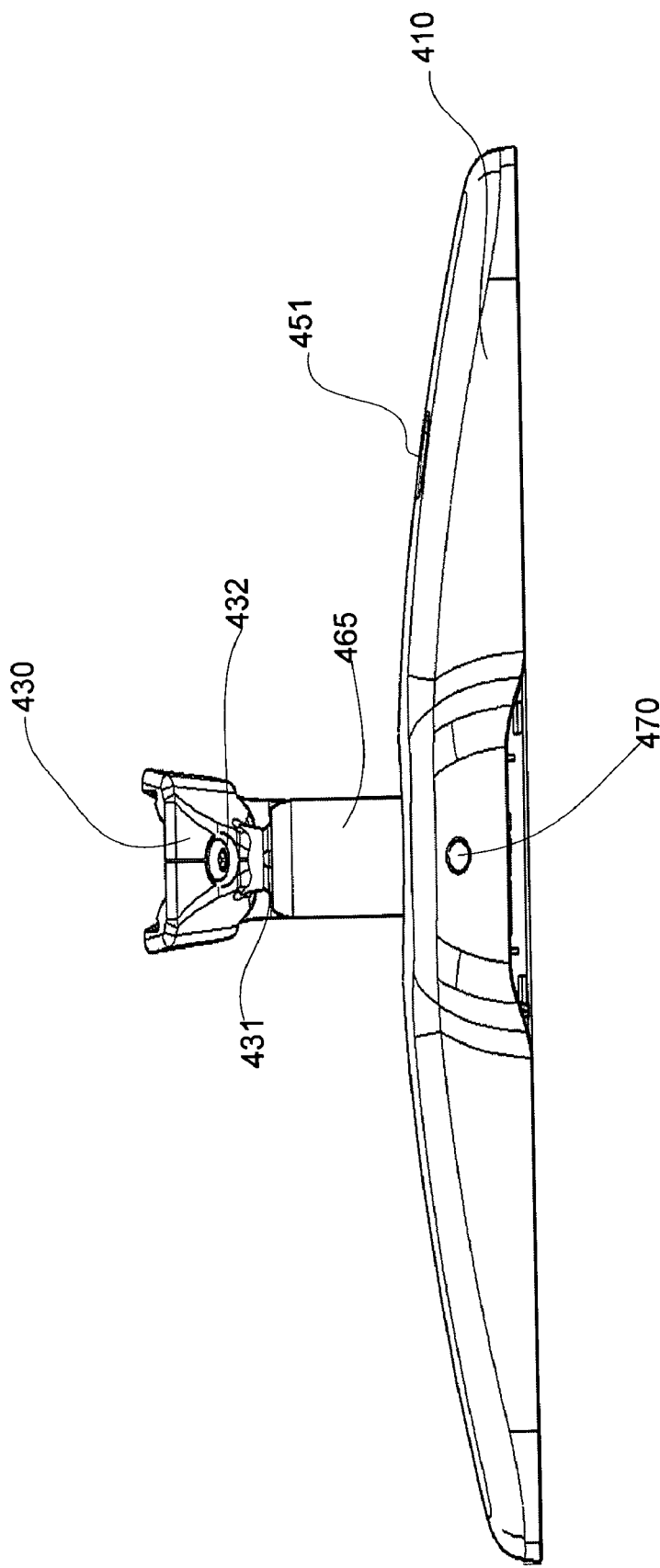
FIG. 4 depicts a bottom profile view of a rearview assembly.

FIG. 4 depicts a bottom profile view of a rearview assembly comprising a housing 410, a mount 430 and a stem 465. In at least one embodiment, a rearview assembly comprises at least one illuminator 470 configured as a map light, a PRNDL light, an interior illuminator, a sub-combination thereof or a combination thereof. In at least one embodiment, at least one microphone 451 and/or at least one speaker may be provided. It should be understood that any of these devices may be incorporated into an accessory module in addition to, or in lieu of, the housing. In at least one embodiment, the mount comprises a first rotation ball 431 and a fastener 432.

Figure 5:
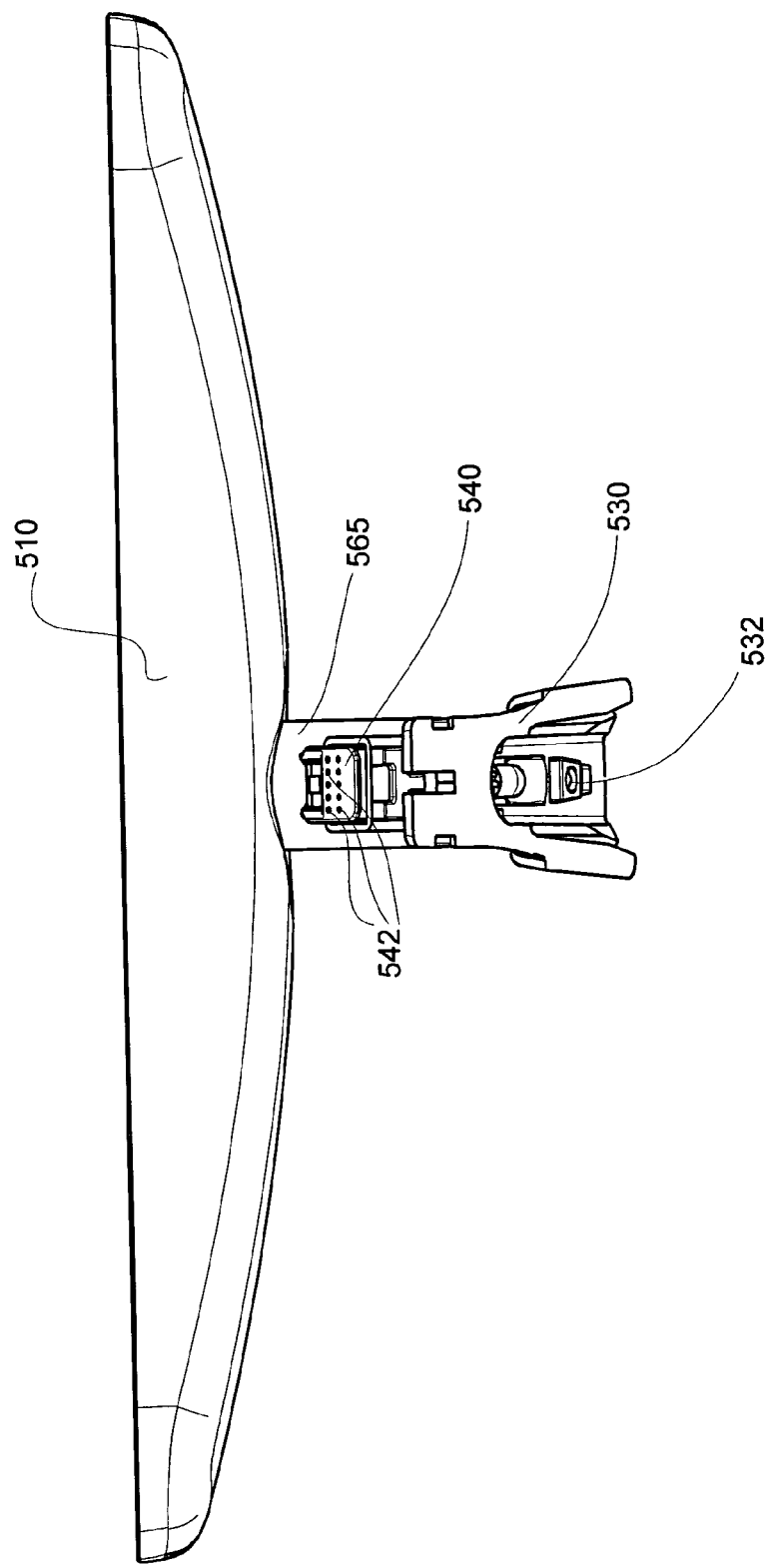
FIG. 5 depicts a top profile view of a rearview assembly.

With reference now to FIG. 5, top profile view of a rearview assembly is depicted comprising a housing 510, a mount 530 and a stem 565. In at least one embodiment, a rearview assembly comprises a connector 540 with at least one socket 542. It should be understood that the connector may be configured as either a socket having female components or a plug having at least one pin configured as a male component; in either event, the socket or plug may have any number of female or male portions such as two, three, four, five, six, seven, eight, nine, ten or more. It should be understood that a given connector may have both a socket and a plug or both a plug and a socket connector may be provided. In at least one embodiment, a mount comprises a fastener 532; it should be understood that the fastener may be a screw and a threaded portion in the mount or may be a friction fit pin.

Figure 6:
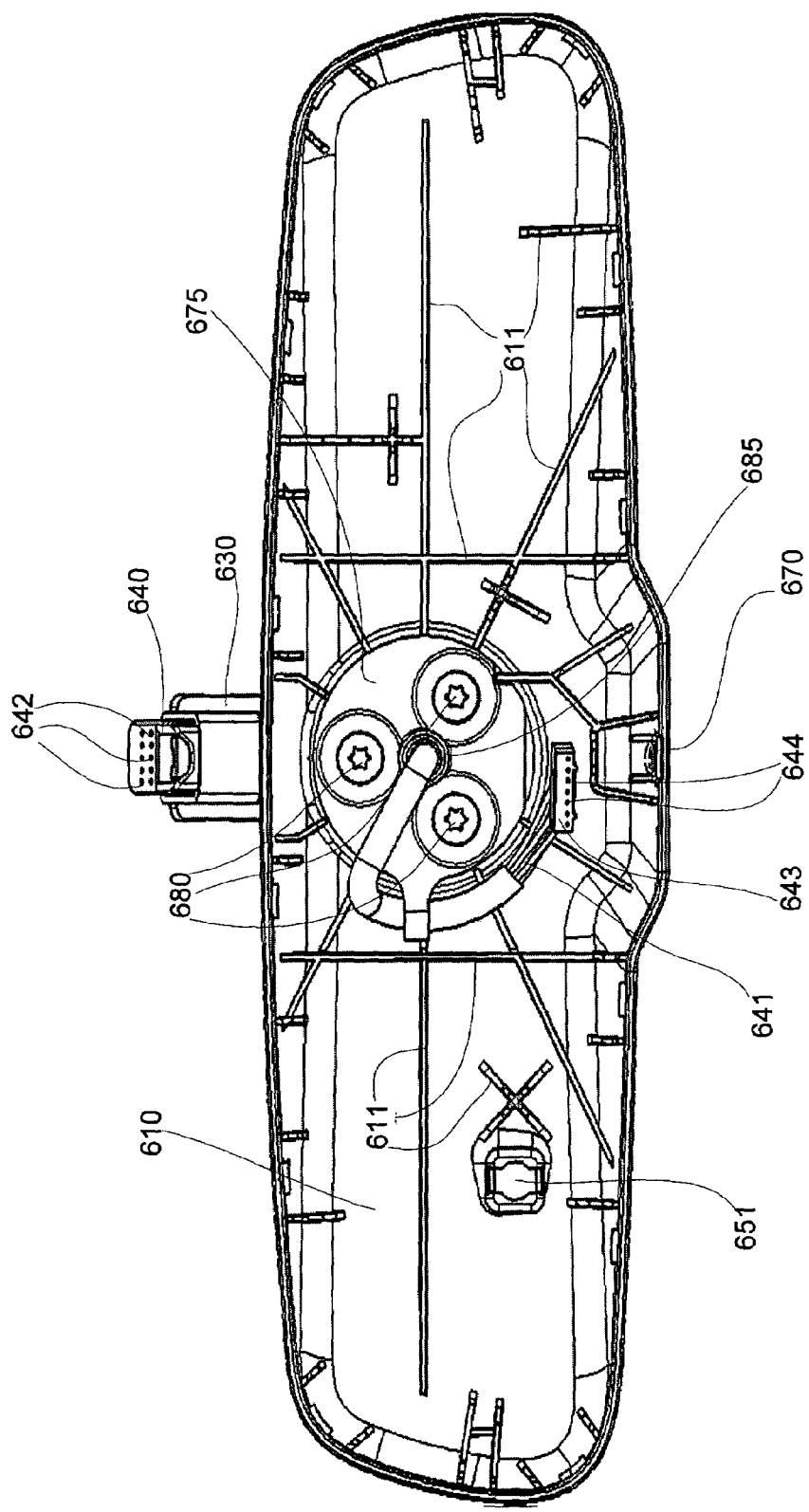
FIG. 6 depicts a front profile view of a portion of a rearview assembly.

FIG. 6 depicts a front profile view of a portion of a rearview assembly comprising a housing 610 having an ambient light sensor aperture 651, an illuminator aperture 670 and strengthening ribs 611. It should be understood that the strengthening ribs may be configured to provide a printed circuit board (not shown) positioning means; the positioning means may also, at least in part, secure the printed circuit board in a desired location. In at least one embodiment, an interconnecting cable 641 is provided with a first connector 640 having sockets and/or pins 642 and a second connector 643 having sockets and/or pins 644. In at least one embodiment, the interconnecting cable is routed through a stem such that it enters the housing through cable aperture 685. In at least one embodiment, the cable aperture is centrally located and surrounded by at least three housing fasteners 680. In at least one embodiment, a washer 675 is provided and configured such that the housing is sandwiched between a housing support member comprising a second rotation ball (not shown in FIG. 6) or a stem (not shown in FIG. 6). In at least one embodiment, a stem is connected to a mount 630 either directly or via a first rotation ball (not shown in FIG. 6). Additional details of the rotation balls, the stem and the mount are depicted and described with regard to other FIGS. contained herein. In at least one embodiment, three housing fasteners 680 are provided substantially evenly spaced around a center point (shown as the cable entrance in FIG. 6); this configuration results in a vibrationally stable rearview assembly with a minimum number of housing fasteners. Both vertical and horizontal stability is provided while having physical strength such that a vehicle occupant can pivot the housing about the mount by grasping the housing and not having to be concerned with breakage; the washer and/or strengthening ribs further reinforce the vibrational characteristics and physical strength.

Figure 7:
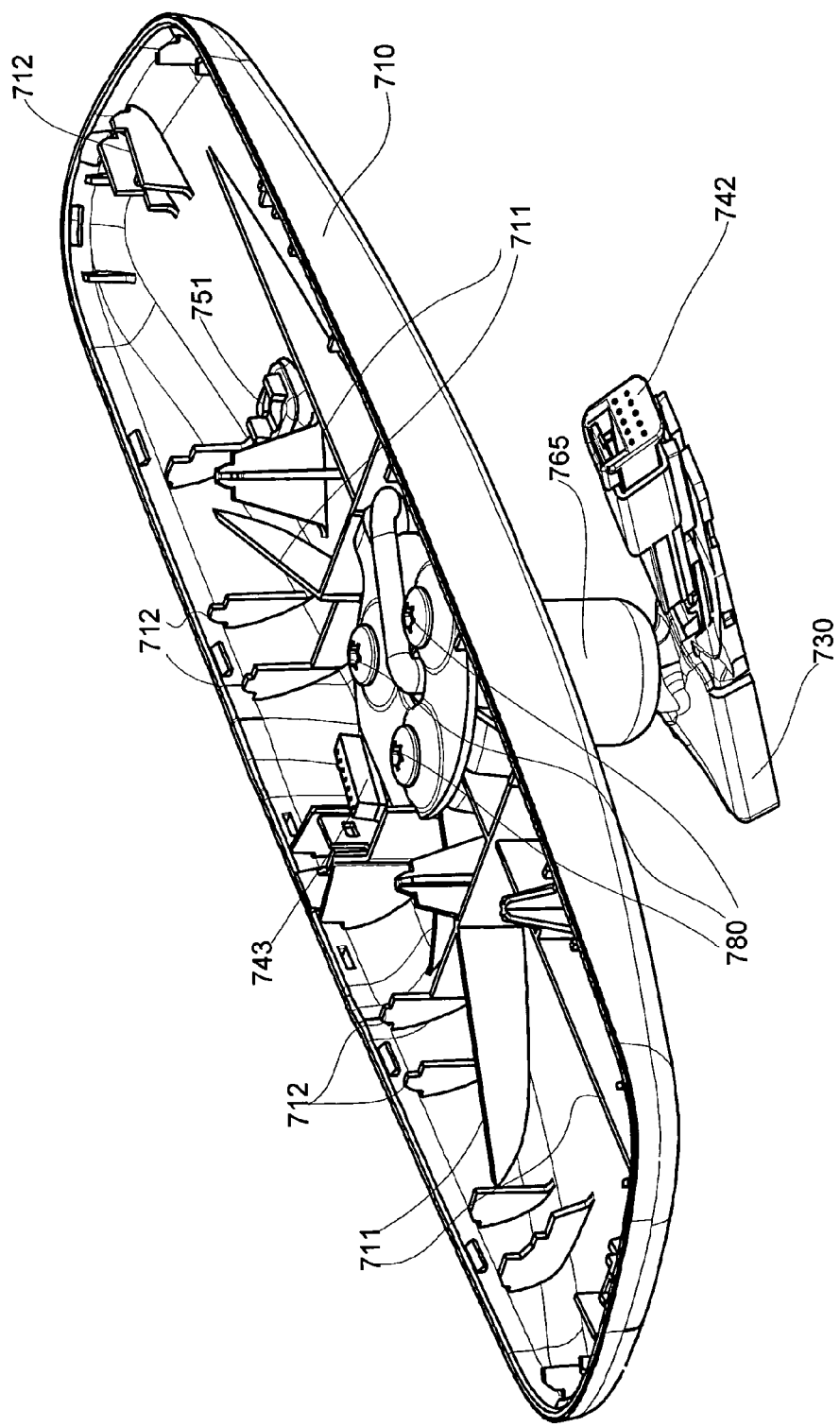
FIG. 7 depicts a front perspective view of a portion of a rearview assembly.

Turning to FIG. 7, a front perspective view of a portion of a rearview assembly is depicted comprising a housing 710, a mount 730 and a stem 765. In at least one embodiment, the housing comprises strengthening ribs 711, printed circuit board positioning members 712 and an ambient light sensor aperture 751. In at least one embodiment, an interconnecting cable is provided comprising a first connector 742 and a second connector 743. It should be understood that either connector may define a socket, a plug or a combination thereof. In at least one embodiment, the housing is attached to either a second rotation ball (not shown) or a stem via at least three housing fasteners 780.

Figure 8:
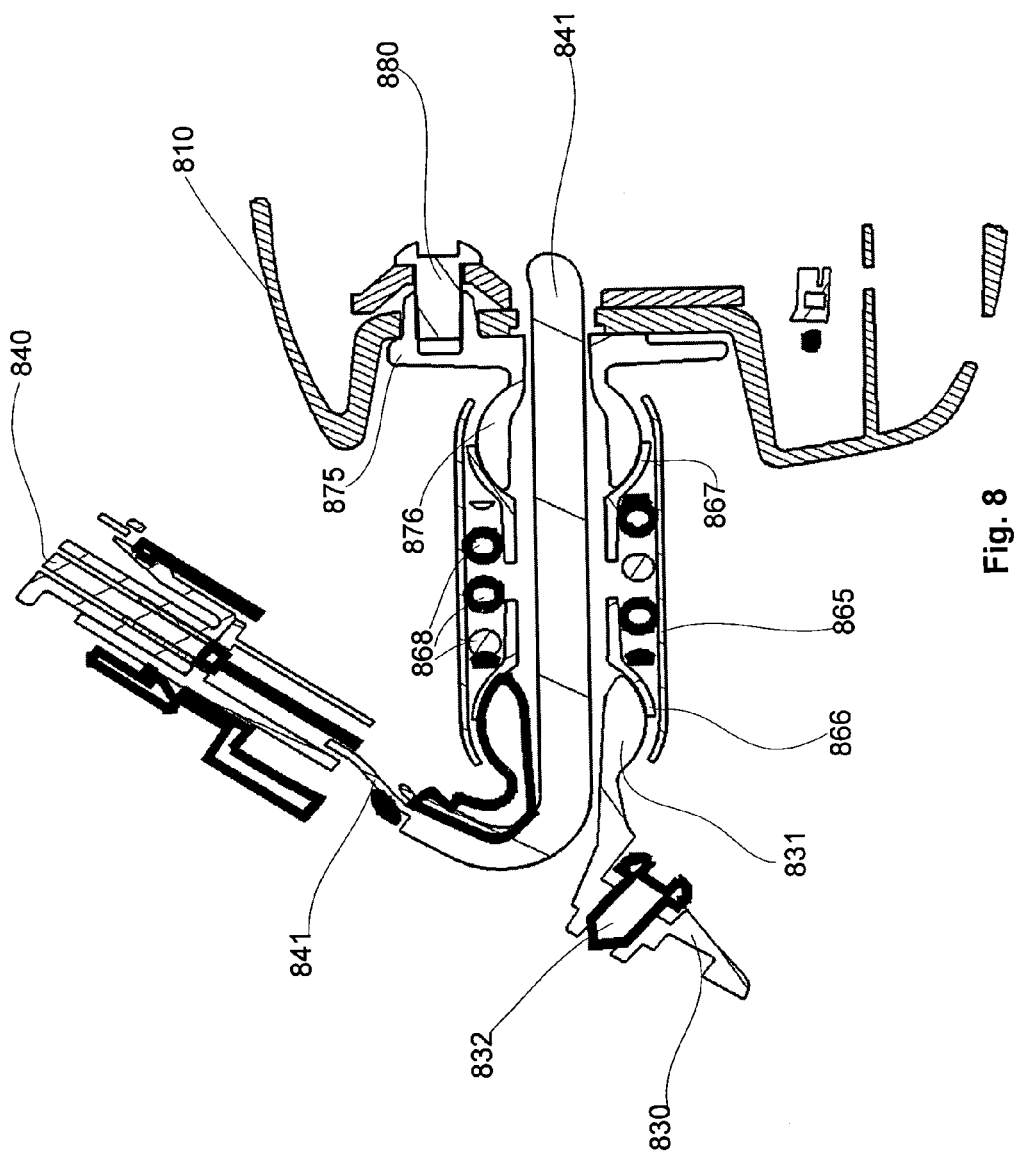
FIG. 8 depicts a side cross sectional view of a portion of a rearview assembly.

With reference to FIG. 8, a side cross-sectional view of a portion of a rearview assembly is depicted comprising housing 810, a mount 830, a stem 865 and a housing support member 875. In at least one embodiment, a housing support member comprises a second rotation ball 876. It should be understood that the housing support member may be rigidly fixed to a stem without having a second rotation ball. In at least one embodiment, a housing is attached to a housing support member via at least one, and preferably at least three housing fasteners 880. In at least one embodiment, a mount comprises a first rotation ball 831 and a fastener 832. In at least one embodiment, a compression spring 868, a first compression member 866 and a second compression member 867 are configured such that the housing may be securely positioned in a desired location by an occupant of the associated vehicle and the housing will remain so positioned once so located. In at least one embodiment, an interconnecting cable 841 is routed through a mount, through a first rotation ball, through the stem assembly, through a second rotation ball and into the housing through a corresponding aperture. This configuration is referred to herein as a two-ball, through-ball, rearview assembly mount. It should be understood that either rotation ball may be omitted such that the housing pivots about only one end of the associated stem. It should also be understood that either rotation ball may form a part of a stem and the corresponding "socket" portion of the stem may form a part of the mount and/or housing support member. It should also be understood that a housing support member may be integrally formed with a corresponding housing. It should be understood that an interconnecting cable may comprise at least one connector 840.

It should be understood that a rearview assembly may comprise any of the electronic components and features depicted and described in commonly assigned U.S. Patent Application publication number 2004/0032638, the entire disclosure of which is incorporated herein by reference.

Although the present invention has been described with regard to specific embodiments, it should be understood that the scope of the present invention extends to all embodiments encompassed within the doctrine of equivalents.

In the illustrated example, the rearview assembly 100 can include accessory module 127, with the accessory module 127 comprising at least one device selected from the group comprising: an imager, an automatic exterior light control module, a moisture sensor module, a compass sensor, a compass, a speaker, a GPS system, a navigation system, a microphone, a windshield wiper automatic control, a digital signal processor, an automatic defogger control, a collision avoidance control, a lane departure warning module, an electro-optic mirror element control module, a supplemental illuminator module, a photo sensor and a processor. It is contemplated that the housing 110 could comprise the at least one device.

What is claimed is:

1. An apparatus, comprising:
   a vehicular rearview element;
   a rearview assembly housing and a housing support member, said housing comprising an interconnecting cable aperture, said housing is attached to said housing support member with at least three housing fasteners, said housing fasteners being substantially evenly spaced surrounding said interconnecting cable aperture, said vehicular rearview element being supported by the rearview assembly housing; and
   a rearview assembly mount comprising a first interlock and a connector comprising a second interlock wherein said first interlock and said second interlock are configured to secure said connector to said mount, the rearview assembly mount supporting the rearview assembly housing and the housing support member.

2. An apparatus as in claim 1 wherein said housing fasteners are screws threadingly received within said housing support member.

3. An apparatus as in claim 1 further comprising a washer configured such that said housing is sandwiched between said washer and said housing support member.

4. An apparatus as in claim 1 wherein said connector is sufficiently secured to said mount such that a wire harness can be engaged with said connector without additional restraint of said connector, 5. An apparatus as in claim 1 configured as a rearview assembly comprising an accessory module, said accessory module comprising at least one device selected from the group comprising: an imager, an automatic exterior light control module, a moisture sensor module, a compass sensor, a compass, a speaker, a microphone, a windshield wiper automatic control, a digital signal processor, an automatic defogger control, a collision avoidance control, a lane departure warning module, an electro-optic mirror element control module, a supplemental illuminator module, a photo sensor and a processor.

6. An apparatus as in claim 5 configured as a rearview assembly, said housing comprising said at least one device.

7. An apparatus as in claim 1 configured as a rearview assembly, said housing comprising at least one device selected from the group comprising: an imager, an automatic exterior light control module, a one moisture sensor module, a compass sensor, a compass, a speaker, a microphone, a windshield wiper automatic control, a digital signal processor, a digital sound processor, a GPS system, a navigation system, an automatic defogger control, a collision avoidance control, a lane departure warning module, an electro-optic mirror element control module, a supplemental illuminator module, a photo sensor and a processor.

8. An apparatus, comprising:
a vehicular rearview element;
a rearview assembly mount comprising a first interlock and a connector comprising a second interlock wherein said first interlock and said second interlock are configured to secure said connector to said mount, wherein said connector is sufficiently secured to said mount such that a wire harness can be engaged with said connector without additional restraint of said connector; and
a housing and a housing support member, said housing comprising an interconnecting cable aperture, said housing is attached to said housing support member with at least three housing fasteners, said housing fasteners being substantially evenly spaced surrounding said interconnecting cable aperture;
said vehicular rearview element being supported by the housing; and
the rearview assembly mount supporting the housing and the housing support member.

9. An apparatus as in claim 8 wherein said housing fasteners are screws threadingly received within said housing support member.

10. An apparatus as in claim 8 further comprising a washer configured such that said housing is sandwiched between said washer and said housing support member.

11. An apparatus as in claim 8 configured as a rearview assembly, said housing comprising at least one device selected from the group comprising: an imager, an automatic exterior light control module, a one moisture sensor module, a compass sensor, a compass, a speaker, a microphone, a windshield wiper automatic control, a digital signal processor, a digital sound processor, a GPS system, a navigation system, an automatic defogger control, a collision avoidance control, a lane departure warning module, an electro-optic mirror element control module, a supplemental illuminator module, a photo sensor and a processor.

* * * * *

UNITED STATES PATENT AND TRADEMARK OFFICE
CERTIFICATE OF CORRECTION

| | | |
|---|---|---|
| PATENT NO. | : 7,488,083 B2 | Page 1 of 1 |
| APPLICATION NO. | : 11/209154 | |
| DATED | : February 10, 2009 | |
| INVENTOR(S) | : Steven G. Hoek et al. | |

It is certified that error appears in the above-identified patent and that said Letters Patent is hereby corrected as shown below:

Column 5, claim 6 currently reads as "An apparatus as in claim 5 configured as a rearview assembly, said housing comprising said at least one device" and should read:

-- An apparatus as in claim 1 configured as a rearview assembly, said housing comprising at least one device selected from the group comprising: an imager, an automatic exterior light control module, a one moisture sensor module, a compass sensor, a compass, a speaker, a microphone, a windshield wiper automatic control, a digital signal processor, a digital sound processor, a GPS system, a navigation system, an automatic defogger control, a collision avoidance control, a lane departure warning module, an electro-optic mirror element control module, a supplemental illuminator module, a photo sensor and a processor. --

Column 5, claim 7 currently reads as "An apparatus as in claim 1 configured as a rearview assembly, said housing comprising at least one device selected from the group comprising: an imager, an automatic exterior light control module, a one moisture sensor module, a compass sensor, a compass, a speaker, a microphone, a windshield wiper automatic control, a digital signal processor, a digital sound processor, a GPS system, a navigation system, an automatic defogger control, a collision avoidance control, a lane departure warning module, an electro-optic mirror element control module, a supplemental illuminator module, a photo sensor and a processor" and should read:

-- An apparatus as in claim 5 configured as a rearview assembly, said housing comprising said at least one device. --

Signed and Sealed this

Fifth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,488,083 B2
APPLICATION NO. : 11/209154
DATED : February 10, 2009
INVENTOR(S) : Steven G. Hoek et al.

It is certified that error appears in the above-identified patent and that said Letters Patent is hereby corrected as shown below:

Column 5, claim 6, lines 4 and 5, currently reads as "An apparatus as in claim 5 configured as a rearview assembly, said housing comprising said at least one device" and should read:

-- An apparatus as in claim 1 configured as a rearview assembly, said housing comprising at least one device selected from the group comprising: an imager, an automatic exterior light control module, a one moisture sensor module, a compass sensor, a compass, a speaker, a microphone, a windshield wiper automatic control, a digital signal processor, a digital sound processor, a GPS system, a navigation system, an automatic defogger control, a collision avoidance control, a lane departure warning module, an electro-optic mirror element control module, a supplemental illuminator module, a photo sensor and a processor. --

Column 5, claim 7, lines 6-16, currently reads as "An apparatus as in claim 1 configured as a rearview assembly, said housing comprising at least one device selected from the group comprising: an imager, an automatic exterior light control module, a one moisture sensor module, a compass sensor, a compass, a speaker, a microphone, a windshield wiper automatic control, a digital signal processor, a digital sound processor, a GPS system, a navigation system, an automatic defogger control, a collision avoidance control, a lane departure warning module, an electro-optic mirror element control module, a supplemental illuminator module, a photo sensor and a processor" and should read:

UNITED STATES PATENT AND TRADEMARK OFFICE
CERTIFICATE OF CORRECTION

PATENT NO.         : 7,488,083 B2
APPLICATION NO.    : 11/209154
DATED              : February 10, 2009
INVENTOR(S)        : Steven G. Hoek et al.

It is certified that error appears in the above-identified patent and that said Letters Patent is hereby corrected as shown below:

-- An apparatus as in claim 5 configured as a rearview assembly, said housing comprising said at least one device. --

This certificate supersedes the Certificate of Correction issued May 5, 2009.

Signed and Sealed this

Twenty-sixth Day of May, 2009

JOHN DOLL
*Acting Director of the United States Patent and Trademark Office*